United States Patent [19]

Skyba

[11] Patent Number: 4,716,630
[45] Date of Patent: Jan. 5, 1988

[54] CAM LOCK WITH POSITIVE RELEASE

[76] Inventor: Helmut K. Skyba, Rte. 2, Box 330, Wild Rose, Wis. 54984

[21] Appl. No.: 4,561

[22] Filed: Jan. 20, 1987

[51] Int. Cl.[4] .............................................. F16G 11/00
[52] U.S. Cl. .............................. 24/134 R; 24/134 KB
[58] Field of Search .......... 24/134 R, 134 P, 134 KB; 403/374

[56] References Cited

U.S. PATENT DOCUMENTS

| | | | |
|---|---|---|---|
| 842,329 | 1/1907 | McClean | 24/134 R |
| 950,434 | 2/1910 | Carlson | 24/134 R |
| 1,189,679 | 7/1916 | Furey | 24/134 R |
| 1,410,162 | 3/1922 | Cadwell | 24/134 R |
| 3,256,579 | 6/1966 | Hoover | 24/134 R |
| 3,852,943 | 12/1974 | Healy | 24/134 R |
| 3,861,641 | 1/1975 | Kolic | 24/134 R |
| 4,424,609 | 1/1984 | Boden | 24/134 R |
| 4,639,978 | 2/1987 | Boden | 24/134 R |

*Primary Examiner*—Victor N. Sakran
*Attorney, Agent, or Firm*—Fuller, Puerner & Hohenfeldt, S.C.

[57] ABSTRACT

An improvement to a cam lock mechanism suitable for use in a wide variety of rope and belt tightening apparatus including boat anchor systems and tree seats and climbing aids to insure the positive engagement of the cam locking device employs a transverse rib which substantially spans the rope receiving gap between the ears on the cam wheel bracket.

1 Claim, 4 Drawing Figures

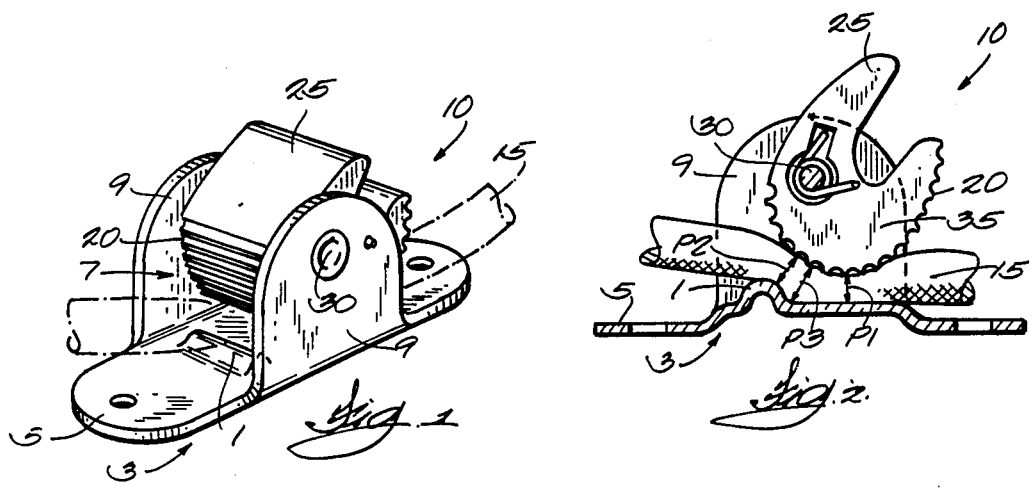
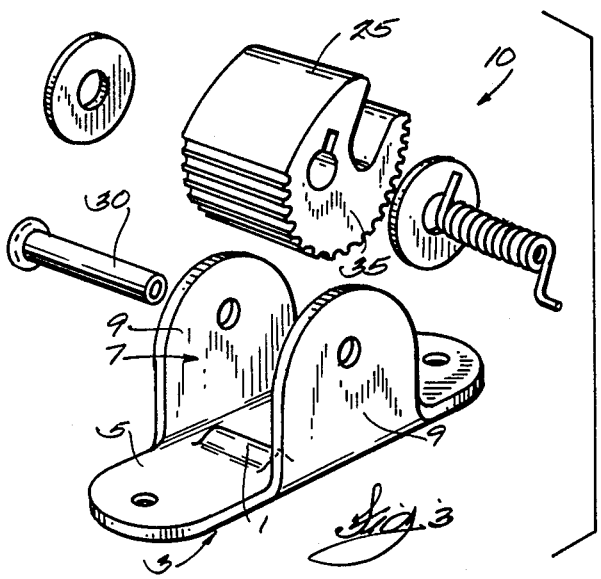
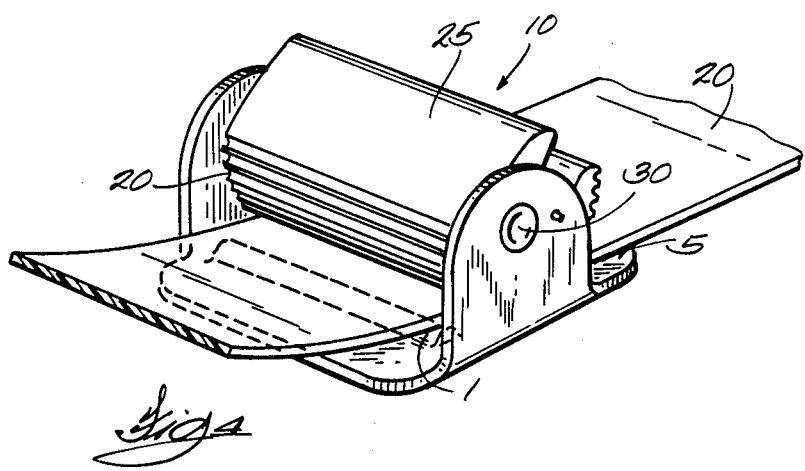

CAM LOCK WITH POSITIVE RELEASE

BACKGROUND OF THE INVENTION

1. Field of the Invention

This invention relates to a cam lock device for a rope or belt to provide adjustment in the length of a loop.

2. Description of the Prior Art

The cam lock device is useful in a tree stand or seat device which requires a loop to connect the stand to the tree. The cam lock can also be employed as a cleat for an anchor rope. The U.S. patent application Ser. No. 794,002 is illustrative of patents on these subjects.

SUMMARY OF THE INVENTION

The invention comprises an improvement to the U.S. patent application Ser. No. 794,002 by providing a positive release to the cam lock.

Ser. No. 794,002 describes a cam locking device which comprises a base portion having two leg portions capable of holding an eccentrically mounted cam wheel. The cam wheel pivots on a pin passing through holes in each of the leg portions. The cam is of such diameter and positioned eccentrically such that it cannot rotate in a complete 360 degree arc without jamming a portion of the rope or strap between the cam wheel and the base portion. Ridges on the cam wheel periphery increase the gripping strength of the cam lock. Other ridges or protrusions on the cam wheel periphery allow the cam wheel to be manually gripped and released thus facilitating strap or rope adjustment of the diameter of the loop around the tree and during ascension or descension of the tree seat. The cam lock mechanism also includes a spring to bias the cam into a rope or strap engaging position and a bushing to hold the spring in place. The locking performance of the mechanism described in the cam locking mechanism of Ser. No. 794,002 was not always positive. The placement of a raised ridge or protrusion in the base portion of the cam locking device provides for a more positive engagement of the cam lock device. The raised ridge or protrusion in the base portion further biases the rope or strap toward the periphery of the eccentrically mounted cam increasing the surface area of the rope or strap in contact with the periphery of the eccentrically mounted cam wheel to insure a more positive engagement between the eccentrically mounted cam wheel and the rope or strap being gripped. Further objects, advantages and features of the invention will become apparent from the disclosure.

BRIEF DESCRIPTION OF THE DRAWINGS

FIG. 1 is a perspective view of the cam lock mechanism with the improvement of the present invention, FIG. 2 is a side elevational view in partial section of the cam lock mechanism with the improvement of the present invention, FIG. 3 is an exploded view of the cam lock mechanism with the improvement of the present invention, FIG. 4 is a further embodiment of the cam lock mechanism with the improvement of the present invention modified to accept a strap.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to the drawings, a raised ridge protrusion or rib 1 is integral with the base portion 5 of the cam locking mechanism 10 and projects perpendicularly from the base portion 5 of bracket 3 toward the eccentric cam wheel 25. As shown in FIG. 2, the raised ridge or protrusion 1 is further positioned on the base portion 5 on the opposite side of the pivot pin 30 and opposite location of the eccentric portion 35 of the cam wheel 25. As shown in FIG. 1, the rib substantially spans the gap 7 between the ears or legs 9 on bracket 3. As the eccentric cam wheel 25 is rotated to engage the rope 15, the raised rib or protrusion 1 in the base portion 5 forces the rope 15 into a two-point pressure point contact with the base with one pressure point at P1 and the other pressure point at P2. Points P1 and P2 are spaced closer to the periphery of the cam wheel when it is in the FIG. 2 position than the base portion P3 between the points P1 and P2. Hence the rope is compressed at those two points with a slight bulge in the rope inbetween as illustrated. The two pressure points enable the same holding power of the cam lock to the rope with less overall compression of the rope. This affords quicker release of the rope from the cam lock than where greater compression of the rope is required at a single pressure point. With the latter situation, more movement of the cam wheel is required for release to free the periphery of the wheel from the greatly compressed rope. The subject matter of application Ser. No. 794,002 is incorporated herein by reference.

An additional embodiment of the invention can be seen in FIG. 4 where the cam locking mechanism 10 is wider than the mechanism in FIGS. 1, 2 and 3 and is adapted to accept a strap 20 instead of a rope 15.

Whereas the present invention has been described in particular relationship to the drawings attached hereto, it should be understood that other and further modifications apart from those shown or suggested herein may be made within the spirit and scope of this invention.

I claim:

1. A cam lock mechanism for a flexible strap or rope or the like comprising a cam wheel having a curved periphery with an eccentric portion thereon, an aperture eccentrically located with respect to the curved periphery, a bracket including a flat base generally all of the cam wheel and two upstanding legs having aligned apertures, a pin extending through the leg apertures and the aperture in the cam wheel to rotatably support the cam wheel, and a raised ridge positioned on and spanning the base between the legs of said bracket opposite the side of said pin that the eccentric portion of said cam wheel is located when said cam wheel is in a rope engaged position, the raised ridge being adapted to cooperate with the cam wheel to clamp the rope between the raised ridge and the cam wheel, wherein said cam lock provides a two pressure point contact between the base and the rope to compress the rope at two spaced points, one pressure point is located between the cam wheel and the flat base lying thereunder; and the other pressure point is located between the cam wheel and the raised ridge.

* * * * *